T. CLARKSON & W. J. MORISON.
METAL WHEEL.
APPLICATION FILED JAN. 25, 1913.

1,107,263.

Patented Aug. 18, 1914.
2 SHEETS—SHEET 1.

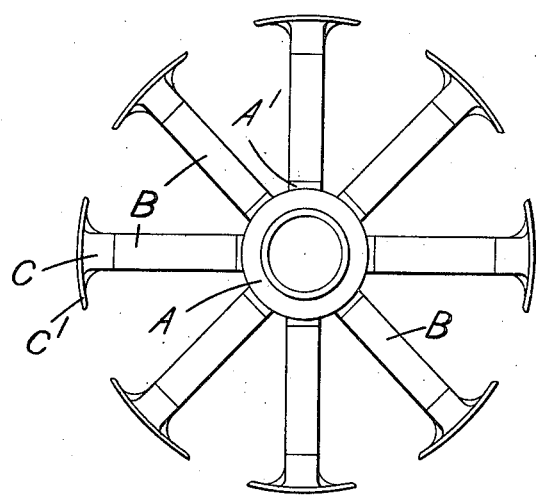
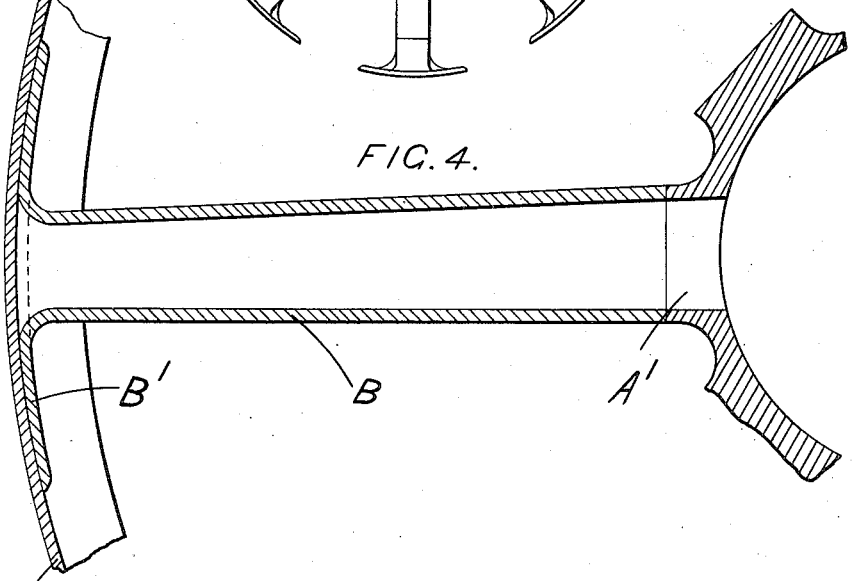
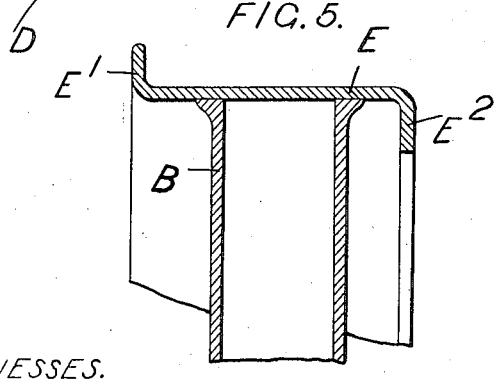
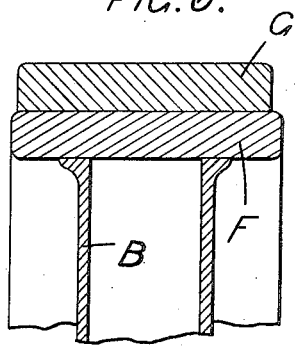

UNITED STATES PATENT OFFICE.

THOMAS CLARKSON AND WILLIAM JOHN MORISON, OF CHELMSFORD, ENGLAND, ASSIGNORS TO THE NATIONAL STEAM CAR COMPANY LIMITED, OF LONDON, ENGLAND.

METAL WHEEL.

1,107,263.  Specification of Letters Patent.  Patented Aug. 18, 1914.

Application filed January 25, 1913. Serial No. 744,228.

*To all whom it may concern:*

Be it known that we, THOMAS CLARKSON and WILLIAM JOHN MORISON, subjects of the King of England, and both residing at Chelmsford, Essex, England, have invented certain new and useful Improvements in Metal Wheels, of which the following is a specification.

This invention relates to the manufacture of metal wheels for road vehicles, particularly those of the heavier type and has for its object to provide a wheel of light construction, which can be made entirely of forged metal.

According to this invention the inner ends of tubular spoke members are butt-welded to flat radial surfaces or bosses formed on a forged hub, the tubes being preferably subjected to pressure during the welding process. The outer ends of the spokes are provided with integral curved flanges or separate flanged members may be butt-welded to the outer ends of the tubes preferably so as to make a flush joint therewith. The flanges of the star wheel thus formed are then machined so as to bring all the spokes to equal length prior to the rim, which comprises one or more annular members, being shrunk on and in some cases additionally secured by rivets or the like passing through the curved flanges on the spoke members. The bosses on the hub are preferably drilled and so made tubular, the other parts of the hub being also machined so as to accommodate the bearings and lighten the construction. The rim conveniently comprises two rings of L-section, the outer surface of which is turned up after attachment to the spokes and the flanges then having tire-retaining flanges connected thereto by rivets or the like. It is preferred to employ electric welding which enables the butt joint between the spokes and the hub, and between the spokes and the flanges to be satisfactorily obtained under pressure.

In the wheel above described no cast metal whatever need be employed. All the material of the wheel can be forged of the highest grade of steel, so that not only is the weight of the wheel materially reduced, but its strength is appreciably increased.

Figure 1:
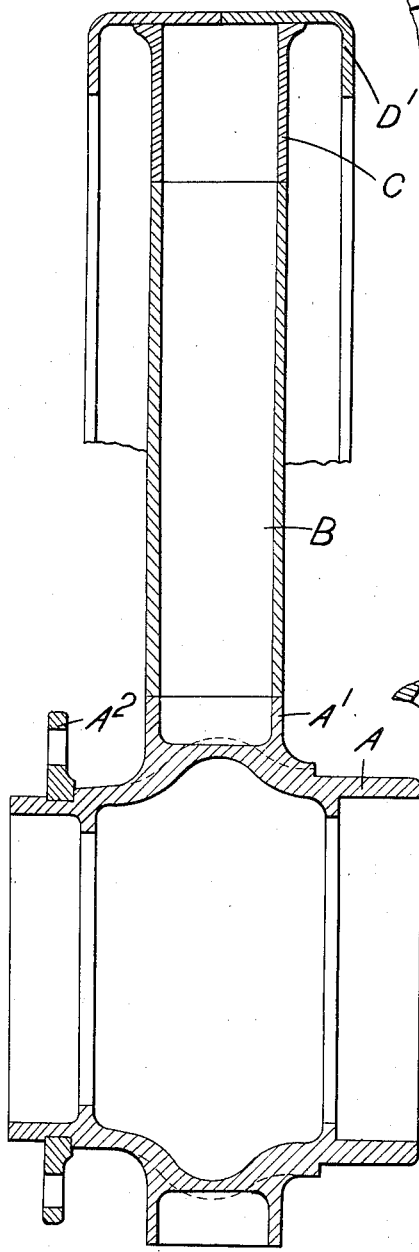
Figure 2:
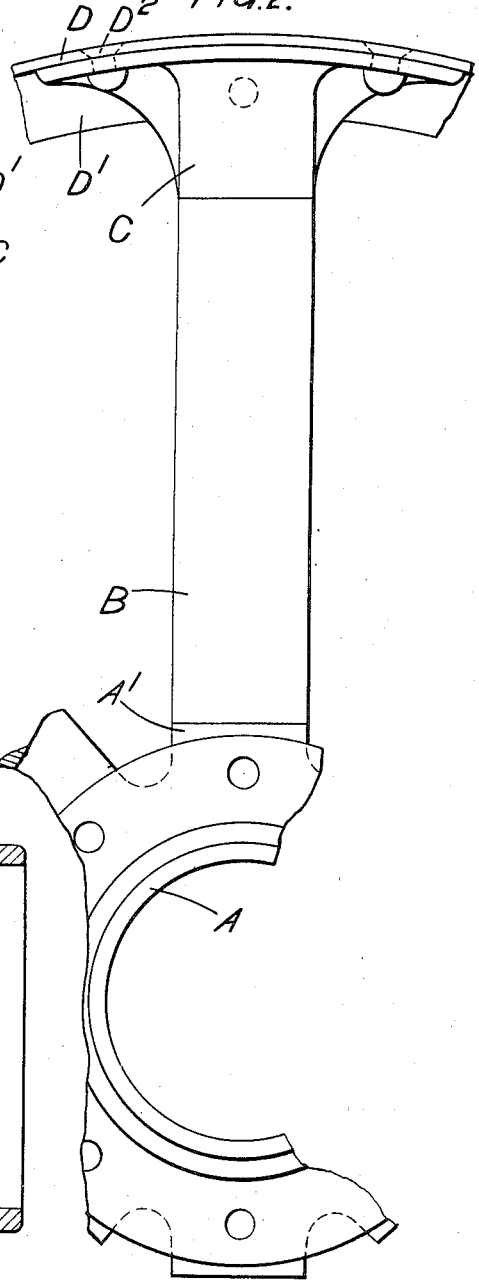

In the accompanying drawings:—Figure 1 is a transverse vertical section through the hub, spoke and rim of one form of wheel in accordance with this invention. Fig. 2 is a side elevation, partly in section, showing the hub, a portion of the rim and its supporting spokes. Fig. 3 is a side elevation, on a reduced scale, of the star wheel prior to the attachment of the rim. Fig. 4 is a sectional side elevation through the outer end of a spoke having a curved flange integral therewith, and Figs. 5 and 6 are transverse sectional views showing alternative forms of rim.

In the construction shown in Figs. 1 to 3 the wheel comprises a forged steel hub A, having radial bosses A' corresponding in number to the spokes the wheel is to have. These bosses are drilled and so formed tubular, as shown, and have their ends machined, the other portions of the hub being machined to accommodate the wheel bearings, brake drum, axle and the like and a ring such as $A^2$ being shrunk on one or both sides of the hub to which is subsequently secured by bolts or rivets the cap or cover for the axle. After the hub has been machined in the manner above described, tubular spoke members B of solid drawn steel tube are welded to the bosses A', the ends of the tubes being first machined and the tubes being conveniently subjected to pressure during the welding process. To the outer ends of the tubular spoke members B are butt-welded flanged members C, having curved lateral flanges C', the outer ends of the tubes, which are also machined being preferably welded to the flanges before the inner ends of the tubes are welded to the hub when they form therewith a star wheel as shown in Fig. 3. When the tubes and flanges are thus welded in place the outer surfaces of the flanges C' can be machined so as to make all the spokes of equal length prior to the attachment of the rim. In the present case the rim comprises two annular members D of L section provided with lateral flanges D' which are shrunk on to the star wheel and additionally secured to the curved flanges C' by rivets $D^2$ or the like passed through the latter. After attachment the rim may be turned up and have its flanges machined and drilled to receive tire-retaining flanges (not shown in the drawings) which may be secured by bolts or rivets.

In the alternative arrangement shown in Fig. 4, the flanged members C, C', do not exist as separate parts, the outer ends of the tubes B being formed with integral curved flanges B'. The rim D is secured in the same way as in the construction already described or the rivets may be omitted as shown.

In Fig. 5 a modified form of rim is shown capable of being applied to spokes with integral flanges or with curved flanges welded thereon as in the construction shown in Fig. 1. In this case the rim comprises a single annular member E having an outwardly extending flange E' at one side—which may form a tire-retaining flange—and an inwardly extending flange E² on the other side. The other tire-retaining flange may be bolted to the flange E² in any known convenient manner.

A further modified form of rim is shown in Fig. 6 where a plain rim F is secured to the outer ends of the spokes or flanged members, diagonal strips G, of metal, wood, rubber, or other resilient material being connected to the tread of the rim.

It will be understood that the particular form of rim, flanges and tread will vary in accordance with the nature of the wheel and the work it is to perform, for instance a wooden felly may be inserted between a plain or flanged rim and the tire or a plain metal tread may be employed. In some cases, if desired, the hub forging may be formed in the first instance with hollowed radial bosses, and the constructional details may be otherwise varied without departing from the invention.

We are aware that various forms of metal wheels have been heretofore proposed, some having hubs and spokes cast integral and others comprising cast hubs with tubular spokes welded thereto, but all of such prior forms of metal wheels have differed in important particulars from and have not possessed the advantages obtained by wheels made according to our invention, and as hereinbefore described. For example, by the present invention, the inner ends of the spokes and the tubular bosses on the forged hub to which said spokes are butt-welded are of the same thickness so that each spoke forms a direct continuation of the boss with both the inner and outer surfaces of the two parts coinciding. This construction provides maximum strength without increasing the weight of the wheel. Heretofore the spokes of wheels of this general type have been inserted in sockets or fitted about projecting pins on the hub, which constructions have by experience been found to be unsatisfactory as they tend to produce fractures at the junction between the spoke and hub.

By the above method of construction, the wheel is lighter, stronger and more economical both in manufacture and use than metal wheels as heretofore manufactured or proposed.

What we claim as our invention and desire to secure by Letters Patent is:—

1. In a metal wheel for vehicles, the combination of a forged hub having tubular radial bosses thereon, tubular steel spokes butt-welded to the outer ends of the bosses with the inner and outer walls of each spoke coinciding with the corresponding walls of the boss, curved lateral flanges at the outer ends of the spokes, and a rim secured to said flanges.

2. In a metal wheel for vehicles, the combination of a forged hub having tubular radial bosses thereon, tubular steel spokes butt-welded to the outer ends of the bosses with the inner and outer walls of each spoke coinciding with the corresponding walls of the boss, and provided at their outer ends with curved lateral flanges, and a rim which is shrunk on to said curved flanges.

3. In a metal wheel for vehicles, the combination of a forged hub having tubular radial bosses thereon, tubular drawn spokes butt-welded to the outer ends of the bosses and forming direct, smooth, continuations of the outer and inner surfaces of the bosses, tubular flanged members butt-welded to and forming extensions of said spokes, and a rim secured to the flanges of the last said members.

In testimony whereof we have signed our names to this specification in the presence of two subscribing witnesses.

THOMAS CLARKSON.
WILLIAM JOHN MORISON.

Witnesses:
 ALICE CLARE COPELAND,
 GERTRUDE MARY BETTERIDGE.